United States Patent [19]

McFarland et al.

[11] Patent Number: 5,414,820
[45] Date of Patent: May 9, 1995

[54] CROSSING TRANSFERS FOR MAXIMIZING THE EFFECTIVE BANDWIDTH IN A DUAL-BUS ARCHITECTURE

[75] Inventors: Harold L. McFarland, San Jose; Allen P. Ho, Fremont, both of Calif.

[73] Assignee: NexGen, Inc., Milpitas, Calif.

[21] Appl. No.: 215,232

[22] Filed: Mar. 21, 1994

Related U.S. Application Data

[62] Division of Ser. No. 748,768, Aug. 23, 1991, Pat. No. 5,369,748.

[51] Int. Cl.6 .................. G06F 13/36; G06F 13/40
[52] U.S. Cl. .................. 395/325; 370/85.1; 364/240; 364/240.2; 364/240.5; 364/242.6; 364/242.92; 364/DIG. 1
[58] Field of Search ........... 395/325, 275, 425, 200; 370/85.1; 340/825.5, 825.06, 825.07

[56] References Cited

U.S. PATENT DOCUMENTS

| | | | |
|---|---|---|---|
| 3,710,324 | 1/1973 | Cohen et al. | 340/172.5 |
| 3,815,099 | 6/1974 | Cohen et al. | 340/172.5 |
| 4,449,183 | 5/1984 | Flahive et al. | 364/200 |
| 4,481,625 | 11/1984 | Roberts et al. | 370/85 |
| 4,519,034 | 5/1985 | Smith et al. | 364/200 |
| 4,535,448 | 8/1985 | Baxter et al. | 370/85 |
| 4,595,923 | 6/1986 | McFarland, Jr. | 340/825.52 |
| 4,648,029 | 3/1987 | Cooper et al. | 364/200 |
| 4,695,948 | 9/1987 | Blevins et al. | 364/200 |
| 4,736,124 | 4/1988 | McFarland, Jr. | 307/471 |
| 4,752,872 | 6/1988 | Ballatore et al. | 364/200 |
| 4,760,515 | 7/1988 | Malmquist et al. | 364/200 |
| 4,785,394 | 11/1988 | Fischer | 364/200 |
| 4,814,974 | 3/1989 | Narayanan et al. | 364/200 |
| 4,837,682 | 6/1989 | Culler | 364/200 |
| 4,941,086 | 7/1990 | Kriz | 364/200 |
| 4,953,072 | 8/1990 | Williams | 364/200 |
| 4,975,838 | 12/1990 | Mizuno et al. | 395/275 |
| 4,979,099 | 12/1990 | Milia et al. | 364/200 |
| 4,982,321 | 1/1991 | Pantry et al. | 364/200 |
| 5,060,139 | 10/1991 | Theus | 364/200 |
| 5,072,363 | 12/1991 | Gallagher | 395/725 |
| 5,072,369 | 12/1991 | Theus et al. | 395/425 |
| 5,077,733 | 12/1991 | Whipple | 370/85.6 |
| 5,081,576 | 1/1992 | Ward | 395/325 |
| 5,083,258 | 1/1992 | Yamasaki | 395/725 |
| 5,083,259 | 1/1992 | Maresh et al. | 395/325 |
| 5,088,028 | 2/1992 | Theus et al. | 395/325 |
| 5,124,981 | 6/1992 | Golding | 370/85.1 |
| 5,125,093 | 6/1992 | McFarland | 395/725 |
| 5,142,672 | 8/1992 | Johnson et al. | 395/500 |
| 5,146,596 | 9/1992 | Whittaker et al. | 395/725 |
| 5,191,657 | 3/1993 | Ludwig et al. | 395/325 |
| 5,195,089 | 3/1993 | Sindhu et al. | 370/85.1 |
| 5,237,695 | 8/1993 | Skokan et al. | 395/725 |
| 5,253,348 | 10/1993 | Scalise | 395/325 |
| 5,274,763 | 12/1993 | Banks | 395/250 |
| 5,289,583 | 2/1994 | Fischer et al. | 395/325 |

*Primary Examiner*—Gopal C. Ray
*Attorney, Agent, or Firm*—Townsend and Townsend Khourie and Crew

[57] ABSTRACT

A dual-bus architecture that includes a high-speed system bus, called the NexBus (20), and a slower peripheral bus, called the alternate bus or AB (25). The NexBus and AB are coupled by control logic (45) which includes an arbiter (50) and an alternate bus interface (ABI) (60). The ABI is treated as a master for both the NexBus and the AB. While it would be possible to have the adapter always request the AB (which also requires the NexBus), that would slow down NexBus operations to the bandwidth of the AB. This problem is avoided by providing two request lines for each adapter, -NREQ (NexBus only) and -AREQ (both buses), having the adapter normally assert -NREQ first. However, if the addressed device is on the AB, the ABI automatically detects this fact and attempts to do a crossing transfer to the AB, even though the request was for the NexBus only. If the ABI is unable to do the crossing transfer because the AB was busy, the ABI automatically causes the NexBus adapter to retry the request using the -AREQ line. Thus the slower AB is only accessed when actually necessary.

21 Claims, 3 Drawing Sheets

CROSSING TRANSFERS FOR MAXIMIZING THE EFFECTIVE BANDWIDTH IN A DUAL-BUS ARCHITECTURE

This is a divisional of application Ser. No. 07/748,768, filed Aug. 23, 1991, now U.S. Pat. No. 5,369,748, issued Nov. 29, 1991.

BACKGROUND OF THE INVENTION

The present invention relates generally to data bus communications, and more specifically to a system incorporating a high-speed bus and a relatively low-speed peripheral bus.

Although it is tempting to view the history of personal computers (PCs) solely in terms of the evolution of CPUs, a more complete view must take into account the evolution of the buses around which the computers are built. Nowhere is this more notable than in the case of IBM-compatible PCs, which are based on Intel-compatible microprocessors.

In 1981, IBM introduced the 8-bit IBM Personal Computer PC XT, based on the Intel 8088 microprocessor running at 4.77 megahertz (4.77 MHz), a 1-megabyte (1-MB) memory address space, 5.25-inch floppies and a system board with five 8-bit expansion bus slots. IBM adopted an open architecture policy and published the technical specifications of the system bus, electronics, and BIOS. IBM and Microsoft developed the 8-bit operating system called DOS. Many manufacturers were able to offer PCs that operated exactly like the IBM PC. This enabled the development and sale of hundreds of PC models, thousands of application software packages and hundreds of XT bus peripheral boards. The 8-bit XT bus ran at 4.77 MHz and offered a peak data transfer rate of less than 500 kilobytes/see (500 KB/sec).

In 1984, IBM upgraded the PC by introducing the 16-bit PC AT, based on the Intel 80286 microprocessor with a 16-MB address range. This microprocessor was offered in 6-, 8-, 12- and 16-MHz versions. The system specification were enhanced and although the technical specifications were not released most PC companies were able to figure out the specifications and offer compatible products. The majority of the systems ran the 8-bit DOS operating system. The PC AT offered a 16-bit I/O bus that became known as the AT bus. This bus extended the XT bus by adding an extra connector and signals. The AT bus accepted both the older 8-bit XT bus cards as well as the new 16-bit AT bus cards. This bus later became known as the Industry Standard Architecture or ISA. The 16-bit AT bus ran at 8 MHz and offered a peak data transfer rate of approximately 2 MB/sec.

Since application software vendors compete against each other on the basis of software features, application software became more functional and complex, and required more processor speed and memory addressing capability. Intel responded in 1986 to these demands with the 16-MHz 32-bit 80386 microprocessor. The 32-bit capability enabled a 4-gigabyte (4-GB) memory address space. However, the majority of 386 systems were sold with the 16-bit ISA bus and 8-bit DOS operating system.

In 1987, IBM introduced a completely new PC architecture called the Micro Channel Architecture (MCA), which introduced a new concept to the PC world called bus mastering. A bus master is a special peripheral card that can transfer blocks of data directly to the system memory without CPU intervention. Bus-mastering offloads the CPU to do other work. Bus-mastering was the first step in bringing multiprocessor technology to the PC. The MCA bus runs at 8 MHz and offers a peak transfer rate of 20 MB/sec.

In the absence of IBM extending the 16-bit ISA bus to 32 bits, many companies employed a two-bus approach-a proprietary 32 bit CPU-to-memory bus with the 16-bit ISA bus for I/O. Compaq offered the "Hex Architecture", AST the "Smart Slot", etc. These 32-bit CPU-to-memory buses were fairly simple and offered nothing more than increased memory bandwidth. Each system was designed to make the memory bus transparent to the operating system software and applications. Eventually, the 32-bit 80386 microprocessor was offered with clock speeds as high as 33 MHz, but the ISA bus remained at 16 bits and 8 MHz, thus becoming a system bottleneck especially in applications with intense disk or graphic activity. Dual bus PCs offered a 32-bit data path to memory matching the width of the CPU but did not address the problem of I/O bottleneck at all. These systems were the first "two-bus PCs" where each bus was tuned to different tasks.

In 1988, Compaq and a group of PC vendors offered a 32-bit extension to the 16-bit ISA bus. The EISA bus is a multi-master bus that runs at 8 MHz, offers a peak transfer rate of 33 MB/sec and can accept both EISA and ISA bus cards. Today, the EISA bus is being offered by many PC compatible companies and is becoming more popular as prices decline and bus cards become more available.

As more complex application software migrates to the PC architecture, faster processors incorporating the latest microprocessor architectural concepts are being developed. These high-performance microprocessors require a high bandwidth to main memory and also create a demand for high bandwidth I/O, far in excess of the bandwidth of the EISA or Micro Channel. Additionally, both of these buses are I/O buses and not multiprocessor buses. Architectures that employ multiples of these advanced microprocessors in a multiprocessor configuration require even higher bus bandwidth and special electronics to coordinate the processor activities. An efficient multiprocessor organization is a tightly-coupled, shared-memory architecture where multiple processors can access to a common main memory over a high-speed bus. Each CPU has its own cache memory. In a multiprocessor architecture, a prime concern is keeping the multiple caches synchronized with the most current data. The system bus must provide cache coherency capabilities so that each processor has an identical view of memory.

Corollary introduced a dual-bus architecture that brought multiprocessor capability and ECC memory to the PC architecture and was the first multiprocessor PC bus to be adopted by several computer companies. Corollary designed a bus that connected multiple CPU caches together which was dubbed the "C-Bus" for "cache" bus. It employs a 32-bit, 16-MHz, 64-MB/sec design and an interrupt scheme to handle multiple processors. This bus also interfaces to the ISA and EISA buses via a special CPU. The C-bus architecture requires this special CPU, called the master, to handle all PC bus system activity. This asymmetry becomes a serious bottleneck as the number of processors increases.

SUMMARY OF THE INVENTION

The present invention provides techniques for interfacing a very fast multiprocessor bus to a much slower peripheral bus in a way that the high bandwidth of the former is maintained except when a device on the former and a device on the latter need to communicate.

The invention is implemented within a dual-bus architecture that includes a high-speed system bus (the NexBus) and a slower peripheral bus (the alternate bus or AB). The AB can be compatible with any of the standard PC buses—for example, ISA, EISA, or MCA. Devices coupled to the bus are referred to as adapters and an adapter capable of taking control of the bus is called a bus master. The NexBus and AB are coupled by control logic which includes an arbiter and an alternate bus interface (ABI). The ABI is treated as a master for both the NexBus and the AB. A NexBus operation begins with arbitration, followed by an address phase and a data phase. An adapter on the NexBus does not know and need not know whether an addressed device is on the NexBus or the AB.

While it would be possible to have the adapter always request the AB (which also requires the NexBus), that would slow down NexBus operations to the bandwidth of the AB. The present invention avoids this problem by providing two request lines for each adapter, -NREQ (NexBus only) and -AREQ (both buses), having the adapter normally assert -NREQ first. However, if the addressed device is on the AB, the ABI automatically detects this fact and attempts to do a crossing transfer to the AB, even though the request was for the NexBus only. If the ABI is unable to do the crossing transfer because the AB was busy, the ABI automatically causes the NexBus adapter to retry the request using the -AREQ line. Thus the slower AB is only accessed when actually necessary. Normally, the arbiter asserts a -GNT line in response to a request on one of the -NREQ or -AREQ lines, and the master receiving the -GNT becomes a "permanent" bus master. If the bus is granted in response to a -NREQ, the master becomes the "permanent NexBus master." If the grant is issued in response to a -AREQ, or a -NREQ that requires a crossing transfer to the AB, the master also becomes the "permanent AB master." The bus may also be granted to "temporary" masters under certain conditions. With a few exceptions described below; AREQ requests have higher priority than NREQ requests.

According to one aspect of the invention, the arbiter contains two fairness registers. One register, the NReqReg, contains one bit for each NexBus adapter's -NREQ line, and a second register, the AReqReg, contains a bit for each -AREQ line. The -NREQ signals are sampled into the NReqReg at the end of a bus operation cycle (as opposed to a bus clock cycle) if all bits of the NReqReg are clear and either AReqReg is empty or an AB master (other than the ABI) is in control of the AB. Note that a AREQ request by a NexBus adapter cannot be granted if an AB master other than the ABI is in control of the AB. Sampling the -NREQ signals causes the corresponding bit of the NReqReg to be set if for each -NREQ line that is asserted. Each bit in the NReqReg is cleared whenever the corresponding -NREQ line is negated, regardless of the state of the bus. Similarly, the -AREQ signals are sampled into the AReqReg at the end of a bus cycle if all bits of both the NReqReg and the AReqReg are clear, and each bit is cleared whenever the corresponding -AREQ line is negated. Sampling the signals into register can be considered a recognition of the request, since a request can only be granted if its bit is set in the fairness register.

In addition, if a NexBus adapter attempts a crossing transfer toga device on the AB, it receives a TryAgain-Later (TAL) signal from the ABI if the AB is busy (i.e., the AB is controlled by an AB master). This tells the adapter to assert its -AREQ line, and the -AREQ line will be sampled into the AReqReg in due course as indicated above. However, if the ABI also saves information about the operation and asserts its SavedTAL line to the arbiter, the bit corresponding to that NexBus adapter is immediately set in the AReqReg. The adapter must then assert its -AREQ line not later than the first clock during which TAL is negated to prevent the bit from being cleared in the AReqReg. This conversion of the highest priority NREQ to an AREQ when the AB is unavailable contributes to effective NexBus utilization. If this were not done, the blocked (TALed) NREQ request would block the lower priority NREQs, regardless of whether they needed the AB. Moving the TALed NREQ request out of the way allows the lower priority, pending NREQ requests that don't need the AB to be productively serviced.

Whenever any bit in the AReqReg is set, the ABI must arbitrate for control of the AB (if it does not already have control). The NexBus is granted to the adapters according to a fixed priority: "Qualified" -AREQ requests have priority over -NREQ requests, and then, in a current embodiment, lower-numbered slots have priority over higher-numbered slots. When the ABI has control of the AB and either the current bus master made its request via an -AREQ line or no adapter is asserting its radial -LOCK signal, then the requests in the AReqReg are said to be "qualified". -LOCK is asserted by a bus master so that it can complete a "semaphore" transfer (e.g., a read-modify-write transaction) without any intervening transfers by any other master. A master that has asserted -LOCK after it has been granted the bus is guaranteed to be granted the bus again after the current bus transaction, even though there may be other higher priority requests. Then, if the AReqReg is not empty, the bus is granted to the highest-priority adapter (e.g., the adapter in the lowest-numbered slot) for which a bit is set in the AReqReg. Otherwise, if there are no qualified bits in the AReqReg (i.e., either the AReqReg is empty or the AB is controlled by an AB master), the bus is granted to the highest-priority adapter for which a bit is set in the NReqReg. As each request is satisfied, the adapter drops its request line for at least one clock, which causes its request bit in the corresponding fairness register to be cleared. When all bits of the fairness register are cleared, the fairness register is again loaded with outstanding requests.

The effect of this arbitration protocol is that all requests, both AREQ and NREQ, that are present when the AReqReg is loaded will be satisfied before AReqReg is re-loaded with new requests. Among these requests, the AREQ requests will be honored first whenever the AB is available. However, if the AB is not available at any time, the arbiter will allow any non-AB requests in the NReqReg to use the NexBus. Furthermore, if the NReqReg becomes empty while the AB is not available and any NREQ requests are asserted, the arbiter will re-load the NReqReg with all such requests and will honor all of them before re-loading the AReqReg with new AREQ requests. However, any SavedTAL requests resulting from TALed NREQ requests are independently loaded into the AReqReg. These features improve efficiency of NexBus utilization when the NexBus would otherwise be idled due to lack of access to the AB.

According to a further aspect of the invention, when no requests capable of being serviced are outstanding, the arbiter grants the NexBus to the previous NexBus master, whether or not it is requesting. This allows the master, should it need the bus again before another adapter requests, to assume control of the NexBus faster since it doesn't have to wait for the request-to-grant delay. In a particular implementation, this saves two bus clock cycles. This can be significant since there is a statistical likelihood that the previous master will be the next master to need the NexBus.

A further understanding of the nature and advantages of the present invention may be realized by reference to the remaining portions of the specification and the drawings.

BRIEF DESCRIPTION OF THE DRAWINGS

FIGS. 2A and 1B are timing diagrams illustrating operations on the NexBus;

BRIEF DESCRIPTION OF THE TABLES

Table 1 describes the NexBus signals;

Table 2 sets forth the AD-bus format during the address/status phase;

Table 3 sets forth the control signals for the NexBus; and

Table 4 sets forth the Map RAM organization.

DESCRIPTION OF SPECIFIC EMBODIMENTS

System Overview

Figure 1:
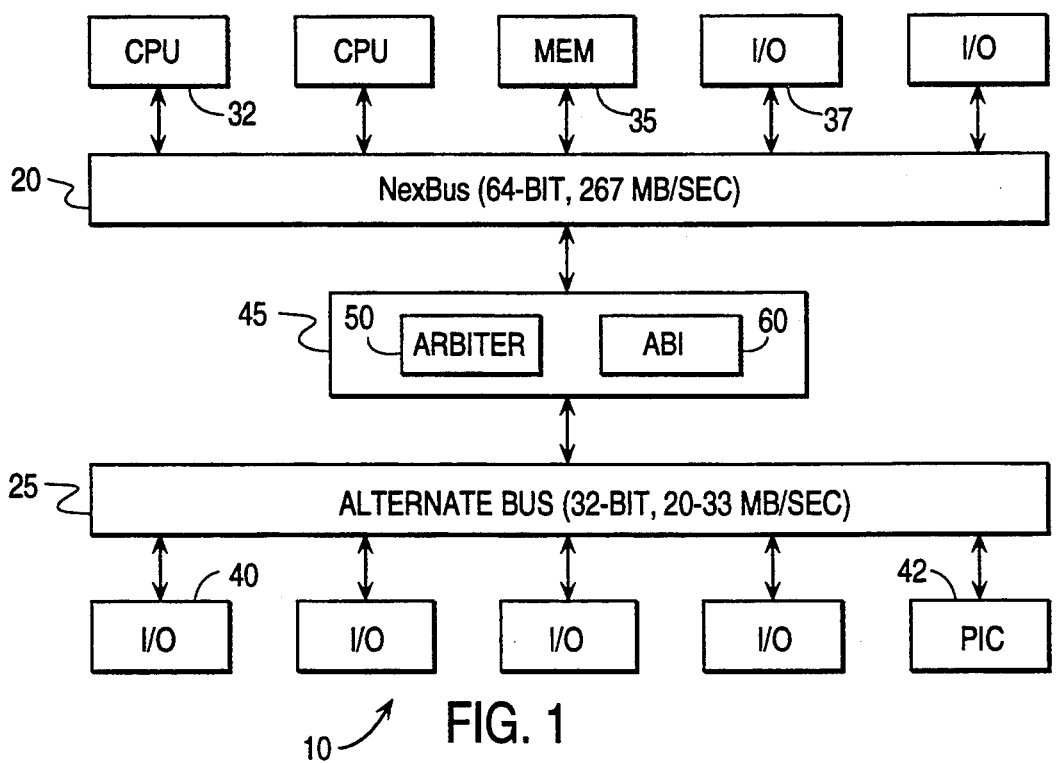
FIG. 1 is a system block diagram illustrating the dual-bus architecture.

FIG. 1 is a block diagram of a (typically multiprocessor) computer system 10 incorporating the bus arbitration of the present invention. The invention is implemented within a dual-bus architecture that includes a high-speed system bus 20 and a slower peripheral bus 25. In a particular embodiment, system bus 20 is a proprietary system bus, sometimes referred to as the NexBus, and peripheral bus 25 is an industry standard bus such as the EISA or MCA bus, sometimes referred to as the alternate bus (AB). Table 1 provides a description of the NexBus signals. The signal names in the tables have a minus sign prefix for active low signals.

Devices coupled to the Nexbus are referred to as adapters, and in a representative system include a number of CPUs 32, one or more shared memory subsystems 35, and possibly a number of high-speed I/O devices 37 such as a high-speed disk controller, a high-speed 3D graphics controller, and a high-speed network controller. A typical CPU adapter includes a high-performance microprocessor with integer and floating point capability and a cache controller and cache memory. The microprocessor may be an Intel 80386 (with associated 80387 numeric coprocessor), an Intel 80486, or a multi-chip processor as described in PCT Publication WO 90/10267, titled "Distributed Pipeline Control for a Computer." The types of devices coupled to AB 25 are the devices that are typically coupled to the expansion bus in a PC, and may include, for example, a number of I/O devices 40 and associated programmable interrupt controllers (PICs) 42. I/O devices 40 are typically slower or narrower versions of the I/O devices coupled to NexBus 20.

NexBus 20 includes a 64-bit multiplexed address and data bus (AD-Bus) and operates with a 30-ns clock (corresponding to about 33 MHz), which represents a maximum data rate of about 267 MB/sec. Bit positions on the AD-bus are numbered from 63 (most significant) to 0 (least significant). A NexBus master (such as one of the CPUs) communicates address and status in one bus phase, and the master or the addressed slave communicates data in a data phase. Table 2 sets forth the information that is communicated during the address/status phase. A 6-bit MID field AD<45:40> allows the specification of 16 slots, each with 4 sub-slots. A 3-bit OP-TYPE field AD<48:46> specifies the type of bus operation.

Buses 20 and 25 are coupled by control logic 45, the relevant portions of which include a NexBus arbiter 50 (usually referred to as the arbiter) and an alternate bus interface (ABI) 60. The control logic also includes group logic, which is responsive to a number of active-low radial signals from the adapters and generates active-high group signals. The group signals are communicated to the adapters in a bused fashion or to other portions of the control logic. A given group signal is generated by NANDing the given radial signal from each of the adapters. Table 3 lists the various NexBus control signals and shows which radial signals have counterpart group signals.

In accordance with known practice, the bus lines are implemented as signal traces on a backplane circuit board, referred to as the motherboard, which also contains most of control logic. The adapters and some control logic are built on circuit boards, which are plugged into connectors on the motherboard. The Nexbus adapter connectors are referred to as slots and are numbered from 0 to 15. Each slot supports 4 sub-slots, which may correspond to separate functional units contained on a single adapter board.

One of the CPUs, referred to as the primary CPU, is in slot 15; the other CPUs, referred to as secondary CPUs, are in the adjacent slots. Both the primary and secondary CPUs can access the AB independently. The primary CPU has certain special features to guarantee compatibility with existing PC software that was written assuming only a single CPU in the system. The current implementation provides for a maximum of eight NexBus adapters to be bus masters. ABI 60 is defined to occupy slot 0 although it is physically part of the motherboard logic. Adapters plugged into the NexBus slots are initialized through memory mapped registers that are located in the upper ranges of the 4-GB memory space. Accesses to these locations enable the system to determine what type of device is plugged into the slot, and to configure each adapter. The address range for system initialization is from (4G−16M) to (4G−8M−1), i.e., from FF000000 to FF7FFFFF. This 8-MB area is divided into 16 regions, each corresponding to a slot. Each region is subdivided into four sub-slot regions, each of which has a memory space of 32 4-KB pages. The processors initialize themselves by reading their own SLOTID bits to determine whether they are primary or secondary CPUs, and branch accordingly to the proper POST (Power On Self Test) code.

Basic NexBus Data Transfers

Any NexBus operation begins with arbitration, followed by an address phase and a data phase. An adapter on the NexBus arbitrates for control of the NexBus by asserting its -NREQ line or -AREQ line (but never both at the same time), whereupon arbiter 60 engages a set of protocols, to be described in detail below, to decide which requesting adapter's -GNT line it should assert. The discussion that follows under this subheading deals with the protocols that define a NexBus operation after the arbitration process has occurred.

The requesting adapter, having seen that its -GNT line is asserted, places the address of a 64-bit octet on AD<31:3> (for memory-reference operations) or the address of a 32-bit quad on AD<15:2> (for I/O operations). It drives status bits on AD<51:32> and asserts its -ALE signal (thereby causing GALE to be asserted) to assume bus mastership and to indicate that there is valid address on the bus. As seen in Table 2, the status information includes the type of operation to be performed and Byte-Enable bits defining the subset of the octet that is required in the (first) data transfer. The master asserts its -ALE signal for only one bus clock. The slave uses the GALE signal to enable the latching of address and status from the bus.

To avoid bus contention caused by the turn on and turn off time of different adapters' buffers driving the AD<63:0>lines, there must be a minimum of one idle clock between operations. This is assured by the arbiter's negating all -GNT lines in the clock following a GALE, and keeping them negated until an end-of-operation is detected, as determined by detecting that GXACK has been asserted and then GXACK has become negated. The arbiter may issue a new grant in the clock following the first clock in which GXACK becomes negated, which immediately follows the last data transfer. The new master cannot assert GALE until the next clock, insuring that no one drives AD<63:0> during the first clock that the grant is asserted.

Figure 2A:
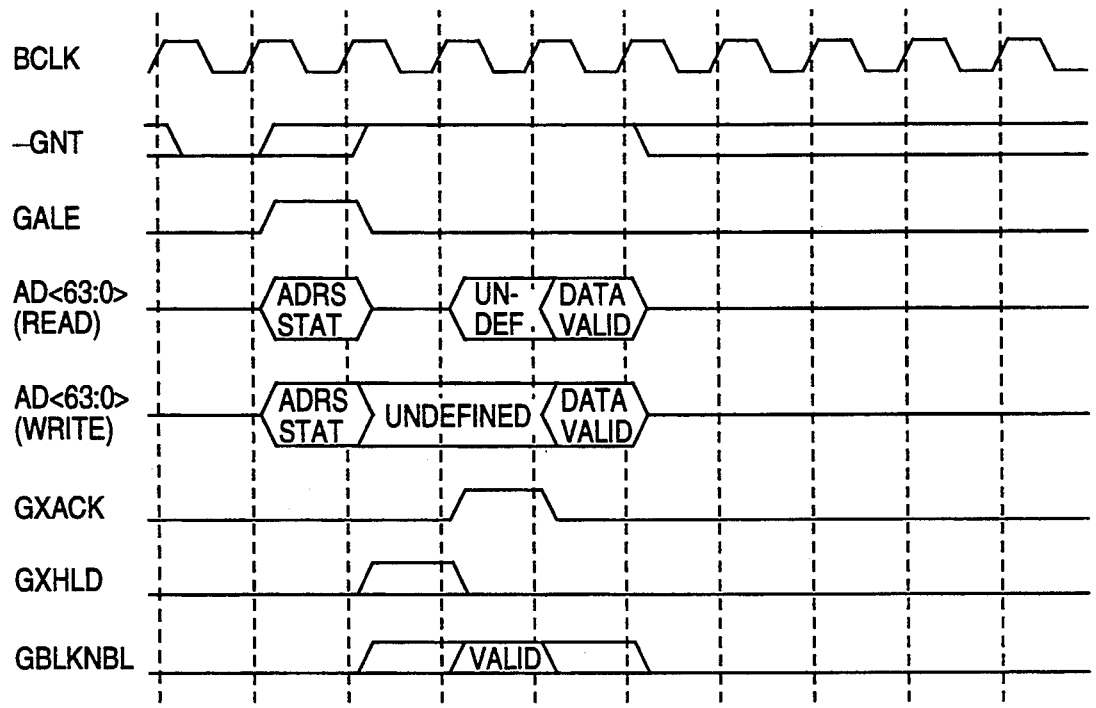

FIG. 2A is a timing diagram of single-octet read and write operations between adapters without wait states. The data phase of a single-octet read operation starts when the slave responds to the master's request by asserting its -XACK signal. The master samples the GXACK and GXHLD signals to determine when data is placed on the bus. It samples data from the bus at the end of the clock after GXACK is asserted and GXHLD is negated. The operation finishes with an idle phase of at least one bus clock.

A slave may not assert its -XACK line until the second clock following GALE. (This protocol guarantees enough time to allow caching devices to recognize a dirty cache block and to assert GDCL in time to cancel the data transfer). However, the slave must always assert its -XACK signal during or before the third clock following the GALE, since otherwise the absence of an active GXACK indicates to ABI 60 that the address which the master is accessing resides on AB 25; the ABI must then assume the role of slave and assert GXACK. If appropriate, the slave must assert its -BLKNBL signal no later than it asserts -XACK, and it must keep -BLKNBL asserted until it drops -XACK. It must drive -BLKNBL inactive at or before it stops placing data onto the bus.

Figure 2B:
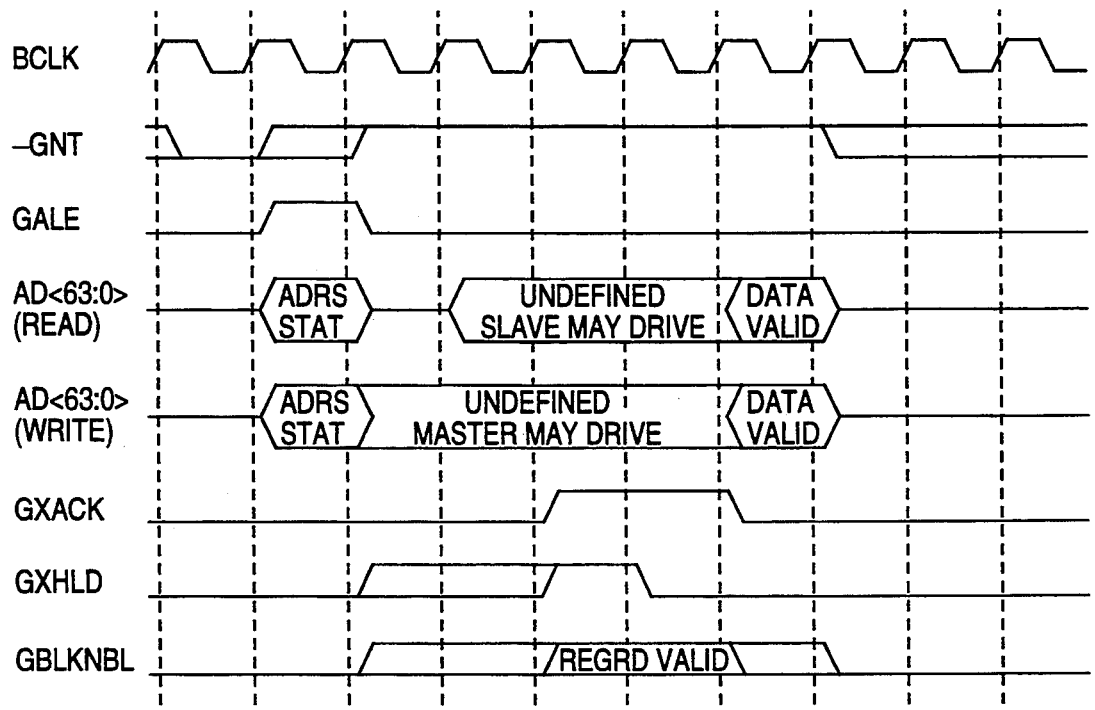

FIG. 2B is a timing diagram of single-octet read and write operations with wait states. If the slave is unable to supply data for a read during the clock immediately following the clock during which it asserts -XACK, the slave must assert its -XHLD line at the same time. Similarly, if the master is not ready to accept data in the next clock it must assert its -XHLD fine. The slave supplies data in the clock following the first clock during which GXACK is asserted and GXHLD is negated, and the master strobes the data at the end of that clock.

For a single-octet read, the slave must negate -XACK after a single clock during which GXACK is asserted and GXHLD is negated, and it must stop driving data onto the bus one clock thereafter. The master may not assert -XHLD while GALE is asserted, nor may either party to the transaction assert -XHLD after the slave negates GXACK. In the case shown, the slave asserts GXACK at the latest allowable time, thereby inserting one wait state, and GXHLD is asserted for one clock to insert an additional wait state. While the slave may or may not drive the AD(63:0) lines during the wait states, the master must not drive them during the data phase of a read operation.

Regarding the write operations without and with wait states, once the bus is granted, the master provides the address and status on the bus and drives its -ALE line active. As in the read operations, the slave must assert its -XACK signal during either the second or third clock following the GALE. If it is not ready to strobe the data at the end of the clock following the assertion of GXACK, the slave must assert its -XHLD line until it is ready to receive data during the following clock. Unless it asserts its -XHLD line, the master must place the data onto the bus in the clock following the clock during which GXACK becomes asserted, which may be as soon as the third clock following the clock in which GALE is asserted. The slave will sample GXHLD to determine when data is valid on the bus. The master may drive data onto the bus as soon as it desires, but it must continue to drive the data onto the bus for one clock (and only one) after it sees GXACK asserted with GXHLD negated. As in the read operations, the slave's -XACK is asserted until the clock following the trailing edge of GXHLD.

Arbitration Regime

Arbitration and bus grant are performed using the -NREQ[n], -AREQ[n], -LOCK[n], -DCL[n], and -GNT[n] lines. Since there are at most eight bus masters, there are eight of each line, corresponding to slots 15 through 8. The ABI has separate ABRIREQ and ABIGNT lines. Normally, the arbiter asserts a -GNT line in response to a request on one of the -NREQ or -AREQ lines, and the master receiving the bus becomes a "permanent" bus master. At a given time, an adapter may assert -NREQ or -AREQ, but must never assert both simultaneously. If the bus is granted in response to a -NREQ, the master becomes the "permanent NexBus master." If the grant is issued in response to a -AREQ or a -NREQ that requires a crossing transfer to the AB, the master also becomes the "permanent AB master."

The bus may also be granted to "temporary" masters under certain conditions. One such temporary master is the ABI, when it requires use of the NexBus to perform a crossing operations for an AB master (including the DMA controller). Another temporary master is an intervenor which asserts its -DCL line to gain temporary NexBus mastership in order to write a dirty cache block back to memory when hit by an operation performed by the permanent master or the ABI. (This is known as DCL intervention). A permanent master may use its -LOCK line to secure its mastership of the bus and prevent an interruption of its bus mastership between bus operations, except for DCL intervention.

Figure 3:
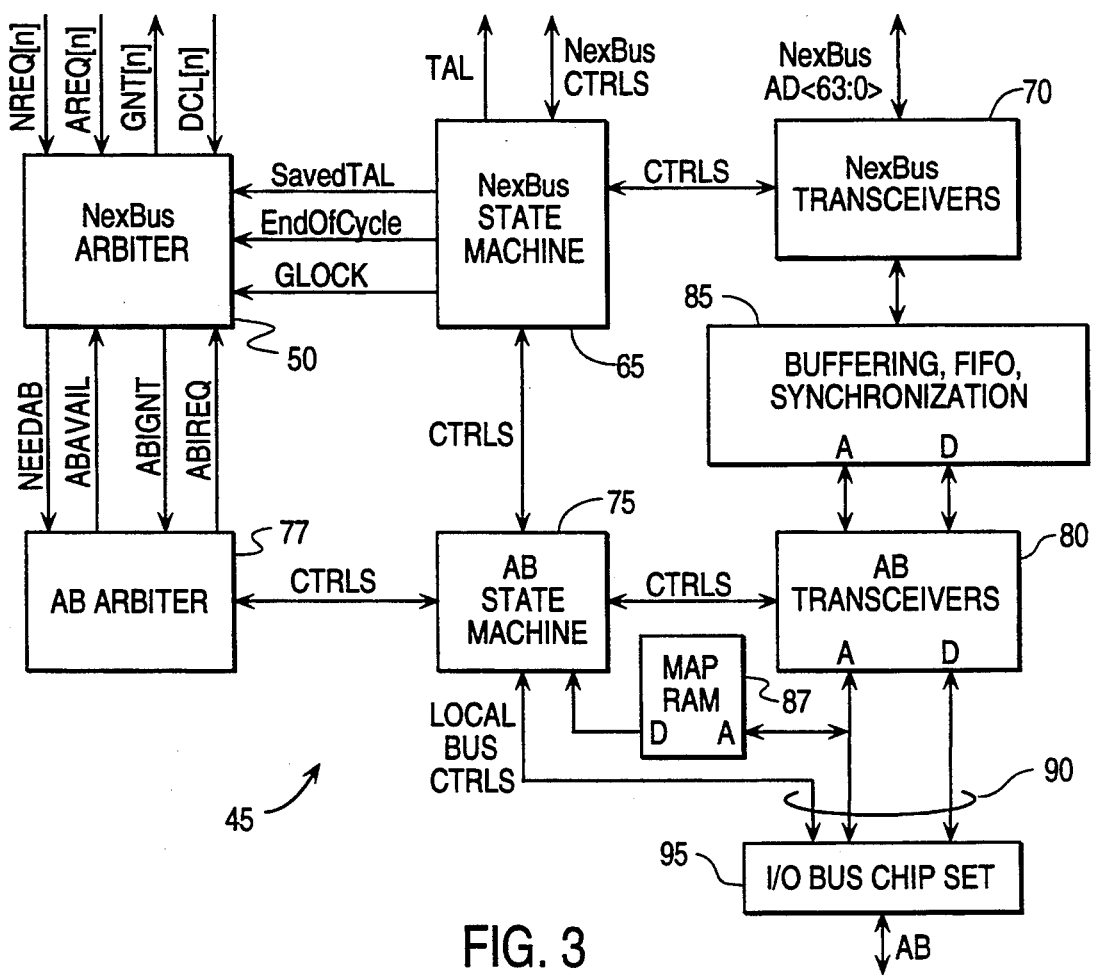
FIG. 3 is a block diagram of the motherboard control logic.

FIG. 3 is a block diagram of control logic 45, showing NexBus arbiter 50 (shown as a single block) and the elements that make up ABI 60. This represents an idealization, since the control logic is actually implemented in a number of PAL devices in a specific implementation and a given function may be distributed over several PALs. A NexBus state machine (NBSM) 65 is responsible for monitoring and issuing control signals on the NexBus and includes the group logic. While the NBSM performs some functions relating solely to the NexBus, it is considered part of the ABI. The ABI further includes a set of NexBus transceivers 70 coupled to the AD-bus, an AB state machine (ABSM) 75, an AB arbiter 77, a set of AB transceivers 80, buffering circuitry 85 for transferring and queuing data between the NexBus transceivers and the AB transceivers, and a Map RAM (MRAM) 87. MRAM 87 contains addresses of all NexBus adapters so the ABI can determine whether a particular operation addresses the NexBus.

In an embodiment where AB 25 is an industry standard peripheral bus, it is convenient to use an even more generic intermediate bus between the Nexbus and the peripheral bus. In a specific embodiment, the above portions of ABI 60 couple the NexBus to a bus 90, referred to as the local bus, that has the same protocol as the local buses on an Intel 80386 (or possibly 80486) microprocessor, and the ABI further includes a commercially available chip set 95 to provide the interface between the local bus and the industry standard bus. For example, in a system using the MCA bus, a Chips and Technologies CHIPS/280 PS/2 Model 70/80 compatible chip set provides the logic support for a 80386-based system using the MCA, and thus effectively completes the interface between the Nexbus and the MCA bus. This particular chip set includes, for example, a DMA controller and the PICs.

A significant aspect of the present invention is the mechanism whereby data transfers between a master on the NexBus and a slave on the AB, or vice versa, are managed in order to maximize effective use of both buses. Accordingly, as will be described in detail below, NexBus arbiter 50 and AB arbiter 77 exchange a number of signals to support what are referred to as crossing operations. A first pair of signals is NEEDAB, asserted by NexBus arbiter 50 when a NexBus master needs to address an AB slave in a NexBus-AB crossing operation, and ABAVAIL, asserted by the AB arbiter to signify the availability of the AB. In a somewhat analogous fashion, AB arbiter 77 asserts a signal ABIREQ when an AB master needs access to the NexBus for an AB-NexBus crossing operation, and the NexBus arbiter responds by asserting an ABIGNT signal. As will be discussed detail below, ABIREQ and the ABIGNT are special cases of the request and grant signals on the NexBus, with the ABI being treated as a NexBus master.

The NBSM monitors the GALE and GXACK group signals in order to determine the end of a cycle, and issues an EndOfCycle signal to arbiter 50. Similarly, as will be described below, it issues the Try Again Later (TAL) signal to the adapters when the AB is unavailable or the ABI is busy, and a SavedTAL signal to the arbiter in the event that it saves information regarding the transaction. An operation that results in TAL being asserted is referred to as a TALed operation. The adapter is referred to as a TALed adapter.

Figure 4:
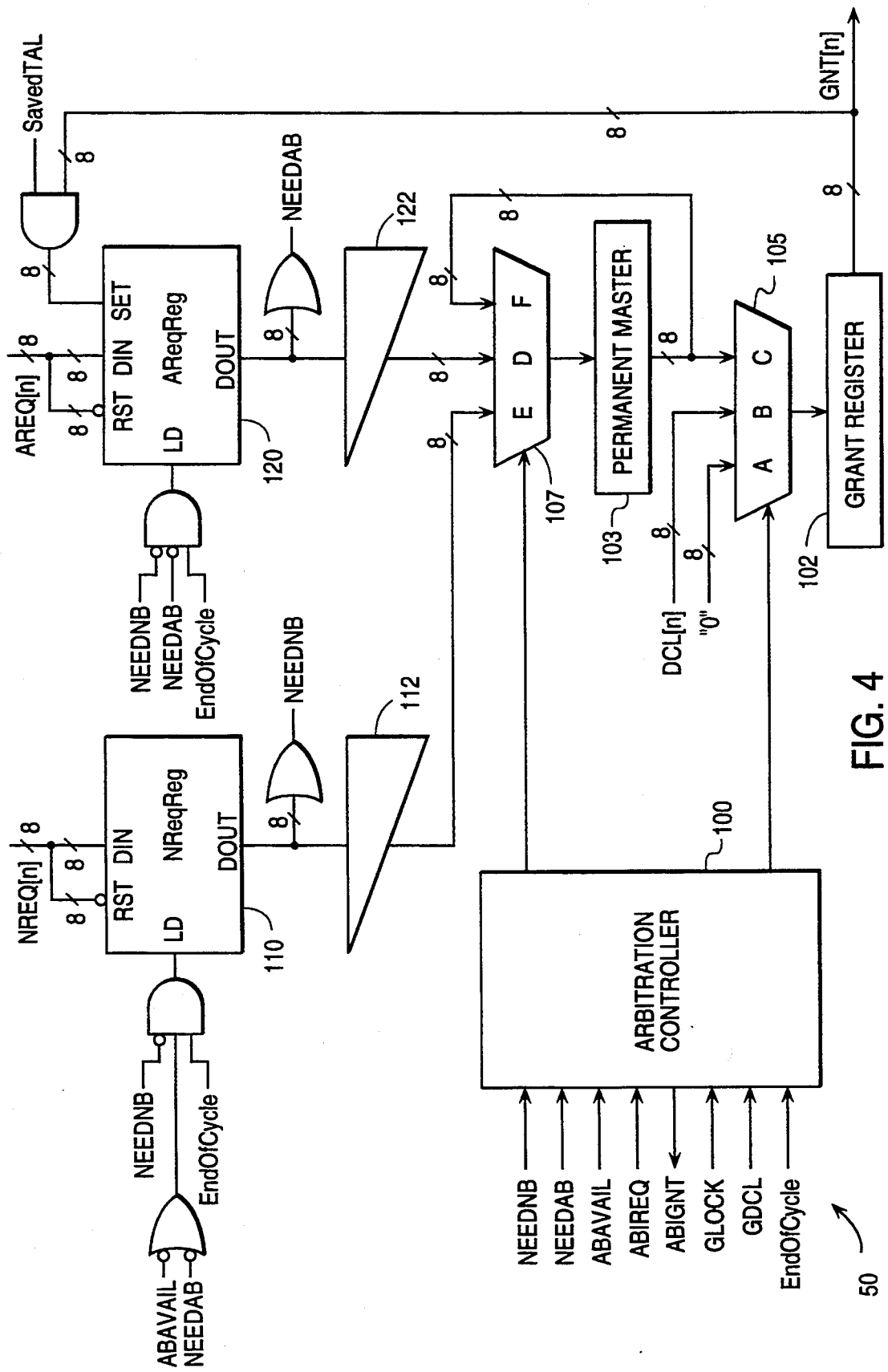
FIG. 4 is a block diagram of the arbiter.

FIG. 4 is a detailed block diagram of NexBus arbiter 50. In order to clarify the operation, all signals are shown as active high, notwithstanding the fact that in the specific implementation, radial signals are active low. The major elements include a centralized arbitration controller 100, a grant register 102, a permanent master (PM) register 103, data selectors 105 and 107, a first fairness register (NReqReg) 110 with an associated priority encoder 112, and a second fairness register (AReqReg) 120 with an associated priority encoder 122. Grant register 102 controls the GNT lines corresponding to the eight possible masters on the NexBus, and is loaded from data selector 105, which is controlled by arbitration controller 100. The inputs to data selector 105 are "all zeros" as input (A), the DCL lines as input (B), and the content of PM register 103 as input (C). Register 103 is loaded from the output of data selector 107, which is also controlled by arbitration controller 100. The inputs to data selector 107 are the priority encoders' outputs as inputs (E) and (D), and the content of the PM register as input (F). Each 8-bit input to the data selectors is generated in such a way that it can have at most a single bit set (this ensures that only one master can be granted the NexBus at a given time).

Each of the fairness registers comprises eight individually settable and resettable (but not individually loadable) flip-flops. The registers are loaded from the NREQ or AREQ lines, data loading being controlled by a signal at a single load input for each register. The NREQ and AREQ lines directly control the registers' reset inputs, so any NexBus master can clear its bit in the NReqReg (or AReqReg) by negating its NREQ (or AREQ) line. The EndOfCycle signal qualifies the load input signals, so that loading the NReqReg and AReqReg with the current state of the NREQ and AREQ lines can only occur at the end of a bus operation. However, additional conditions are imposed on loading the registers.

Specifically, loading of NReqReg 110 from the NREQ lines is prevented if any bit in the NReqReg is set (NEEDNB asserted). Loading of the NReqReg is also prevented if any bit in the AReqReg is set (NEEDAB asserted) and the AB is available (ABAVAIL asserted). loading of AReqReg 120 from the AREQ lines prevented if any bit in the NReqReg is set (NEEDNB asserted). Loading of the AReqReg is also prevented if any bit in the AReqReg is set (NEEDAB asserted). A bit in the AReqReg can be set if the corresponding bit is set in the grant register and SavedTAL is asserted. This signifies that the corresponding adapter received a grant in response to NREQ and received the TAL signal, but also received the SavedTAL signal, signifying that the information was saved. The NReqReg and AReqReg outputs are communicated to their respective priority encoders, each of which sets a single bit corresponding to the highest priority requesting master (determined by the requesting adaptor with the lowest slot number in this particular implementation). These various possible data sources for the grant and PM registers, including the circumstances under which each is selected, will be discussed in detail below. Arbitration controller 100 contains logic defining the arbitration protocol, and to this end determines which of the 8-bit inputs to data selector 105 is written into grant register 102 and which of the 8-bit inputs to data selector 107 is written into PM register 103. As discussed above, -GNT is normally withdrawn when the adapter asserts its -ALE, and therefore input (A) remains selected during the bus operation and for one clock cycle beyond the end of the operation.

The following sequence represents the basic protocol that governs the use of the NexBus. First, the controller checks whether the current bus operation has completed (EndOfCycle asserted). If not, then "all zeros" remains presented to the grant register, which signifies no grant. If it is the end of the operation, the controller then checks whether any of the adapters is asserting its DCL line. If so, the DCL lines are presented to the grant register (DCL intervention is the highest priority request—actually a demand rather than a request), and temporary NexBus mastership is granted to the adapter that is asserting its -DCL line in order that it may write a dirty cache block back to memory. If no DCL line is asserted, the controller then checks whether ABIREQ is being asserted. If it is, then "all zeros" remains presented to the grant register and the controller asserts ABIGNT and the ABI becomes a temporary NexBus master. If not, the controller presents the content of the PM register to the grant register.

The controller loads PM register 103 as follows. It first checks for a qualified AREQ request. If there is a bit set in the AReqReg (NEEDAB asserted), and the AB is available (ABAVAIL asserted), then the output of priority encoder 122 is presented to the PM register, subject to a further condition. This condition is that no adapter is asserting its lock signal (GLOCK not asserted) or the previous grant was in response to an AREQ. If there is no qualified AREQ request, the controller then checks if there are any NREQ requests (NEEDAB asserted), and if so, presents the content of priority encoder 122 to the PM register, thereby asserting the grant line for the highest priority adapter that is asserting NREQ. If none of the above conditions occur, the controller presents the content of the PM register back to the PM register in order that the current permanent NexBus master retains mastership, whether or not it is requesting.

The following pseudocode representation of this prioritization is executed every bus clock. The letters A-F in parentheses refer to the inputs of data selectors 105 and 107 ira FIG. 4:

If (Not EndOfCycle)
Then (A)/* No grant */
Else If (GDCL)
Then (B)/* Grant to master asserting DCL */
Else If ABIREQ
Then (A) and ABIGNT/* Grant to ABI */
Else If (ABAVAIL and NEEDAB)
and (-GLOCK or Last GNT Was AREQ Gnt)
Then (C) and (D)/* Grant to highest priority qualified AREQ */
Else If (NEEDNB)
Then (C) and (E)/* Grant to highest priority NREQ */
Else (C) and (F)/* Grant to previous permanent master */

A "grant" becomes effective only when the adapter that is granted the bus actually assumes bus mastership. An adapter assumes bus mastership either by beginning an operation, which it may do by asserting its -ALE line for one clock period, or by asserting its -LOCK line. It may do this in any clock that immediately follows a clock period during which its -GNT line was asserted. Simultaneously with the assertion of its -ALE, the adapter must negate its request line if it does not intend to request another bus operation immediately. If the requester does intend to perform another bus operation after the current transaction is over and it does not intend to begin a locked sequence, it can continue driving its request line active, provided that it has not held the bus for more than 1.5 microseconds. Holding an -AREQ request active will prevent another device's gaining the bus, since its bit in the request register will remain set and the register will not therefore be re-loaded. The ABI will retain control of the AB as long as the -AREQ of the current AB master is asserted. This insures that "locked" sequences of bus operations are not interrupted by AB masters. Holding an -NREQ active will prevent another device's gaining the bus only if -LOCK is also asserted, since otherwise the -GNT may be removed and an -AREQ or ABIREQ may be honored between operations.

Note that the arbiter may change the device that receives a grant from one clock to the next, provided that no -LOCK line is asserted: If no device is requesting the bus when an operation ends, the arbiter will automatically issue a grant to the previous permanent bus master. If, before the previous master re-claims the bus by asserting -ALE or -LOCK, another device requests the bus, the arbiter will remove the original grant and assert a grant to the requesting device during the next clock. Due to timing considerations, an adapter must be allowed to assume bus mastership by asserting -ALE or -LOCK if its -GNT line was asserted during the clock preceding the assertion of -ALE or -LOCK. To prevent a conflict, the arbiter must negate all -GNT lines for one clock before asserting the -GNT of a different adapter. This insures that a second device will not "see" a grant in any clock in which another device assumes bus mastership. If, during that clock, the arbiter sees any -LOCK asserted, it must re-assert -GNT to the previous requester. If, however, it sees GALE asserted during the idle clock it must, of course, recognize the beginning of an operation and withhold all -GNTs until the end of the operation.

An adapter which has received a -GNT in response to an -AREQ can retain control of both the NexBus and the AB without beginning an operation as long as it keeps its -AREQ asserted. Having thus locked both the NexBus and the AB, an adapter may either begin an operation or may simply hold the bus for a while and then release it by negating -AREQ without having performed an operation. However, once the adapter begins an operation it must wait to receive another -GNT before beginning a second operation, even if it keeps -AREQ asserted. The arbiter will always re-issue -GNT to an adapter holding -AREQ asserted, but it may delay the grant to allow for DCL operations (as explained below).

Likewise, a NexBus master that has gained mastership by asserting -NREQ may retain ownership by continuing to assert -NREQ, and may abandon ownership without starting an operation by negating -NREQ. However, such a master may have its -GNT negated temporarily by the arbiter to honor either an -AREQ or an ABIREQ unless it asserts its -LOCK line. If this happens, the -GNT will be negated, and after one clock the bus will be granted to the -AREQ requestor or to the ABI. If the -NREQ requester keeps its -NREQ asserted, its bit in the NReqReg will not be negated, so after all AB requests have been satisfied its -GNT will again be asserted.

Note that, except when an operation is TALed, an adapter must always wait at least one clock after negating its -NREQ line before asserting its -AREQ. This prevents confusion as to whether the adapter has received mastership of the AB. On the other hand, when an operation is TALed by the ABI, the master and arbiter can be assured that the ABI does not have control of the AB. It is important that the master immediately assert -AREQ to insure that it receives and retains top-priority access to the AB if the ABI was idle at the time of the TAL, since the ABI may then begin an operation on behalf of the adapter.

Try-Again-Later (TAL) Operations

When an adapter becomes master by asserting its -NREQ line and initiates an operation that requires the use of the AB at a time when the AB is unavailable, the ABI may assert its TAL signal to abort the operation. TAL will be asserted when an operation attempts to access a slave on the AB and the ABI cannot immediately perform the access, whether because the AB is not available or because the ABI itself is busy. Upon receipt of TAL, the master must re-arbitrate for the bus and try the same operation again, as described below. The ABI must assert TAL during or before the clock that GXACK is asserted. (The ABI can easily insure this, since it is responding as the slave and therefore asserts both TAL and -XACK.) The ABI keeps TAL asserted through the first clock after GXACK is negated, so that it is asserted for a minimum of two clocks.

If TAL is asserted during a bus operation, the master must complete the operation. If the initial TALed operation is a memory or I/O read the master must disregard any data that it receives from the slave; if it is a write or I/O out the ABI will disregard any data transmitted by the master. Upon seeing TAL asserted, the master must negate its -NREQ line (if has not already done so), and it must immediately re-arbitrate for the bus by asserting its -AREQ line. If the master is asserting its -LOCK signal when it sees TAL asserted, it must negate its -LOCK line until it again sees its -GNT asserted; that is, LOCKed sequences performed by asserting -NREQ and -LOCK can be interrupted by TAL. The -AREQ must be asserted not later than the first clock after the first clock that GXACK is negated. (This insures that the OR of TAL and -AREQ is continuous once TAL is asserted.)

The ABI may retain information from the TALed operation, and may use such information to perform memory or I/O read operations on the AB in anticipation of the master's re-trying the operation. Information about one or more such TALed transactions can be retained by the ABI, filed by MID (which is transmitted by the master during the address/status clock of each NexBus operation). Whenever the ABI asserts TAL and saves information about the TALed transaction, the ABI must assert the SavedTAL signal to the arbiter for one clock coinciding with the first clock of the TAL signal. The SavedTAL signal causes the arbiter to immediately set the AReqReg bit of the current bus master, even if the AReqReg is not empty. The AReqReg bit remains set as long as TAL is asserted, and remains set thereafter if and only if the master has asserted its -AREQ line. Whenever the AReqReg contains one or more requests, the arbiter must transmit the MID of the highest-priority outstanding request to the ABI. This allows the ABI to look up the saved information about that adapter's previously attempted crossing transfer (if any). If the adapter previously attempted a read, the ABI can begin the operation on the AB in advance of the master's gaining the NexBus. If it does begin an operation, the ABI must retain control of the AB until the original master is granted the bus and re-tries its operation. The ABI can also assert TAL and SavedTAL when the AB is available, but a read from a slave on the AB is anticipated to take an unreasonably long time to complete.

When it again obtains the bus, the TALed adapter must re-try exactly the same operation as before; otherwise, the wrong data may be returned if the ABI has performed a read-ahead. In order to allow for cases in which the TALed adapter may decide that it does not need to perform the TALed operation after all (e.g., it subsequently receives a reset), or needs to perform something else first, the adapter may cancel any saved operation by clearing its AReqReg bit, which it can do by negating its -AREQ line for one or more clocks. This has the effect of resetting the saved operation, by the following mechanism: The ABI need not be aware of the status of each -AREQ line, but it must reset its memory and "forget" all saved operations whenever the AReqReg becomes empty, and must "forget" an operation saved for an adapter if the same adapter attempts another TALed operation. Since an adapter's AReqReg bit will be set if the ABI asserts SavedTAL and will remain set until it is granted the NexBus and AB to perform the TALed operation, the AReq Reg will remain non-empty until all SavedTAL operations have been performed unless an adapter negates its -AREQ line, which causes its AReqReg bit to be cleared. The fact that AReqReg has become empty must be signaled to the ABI by the arbiter (by, for example, indicating a highest-priority AReqReg bit of 0, the ABI's MID).

It should be noted that it is possible that after a caching adapter has received a TAL and while the (would-be) master is re-arbitrating for the bus another adapter may become master and start an operation on the bus that hits a dirty cache line in the first (TALed) adapter. The first master should then respond to the operation on the bus according to the rules of the intervenor protocol without negating its -AREQ line. After writing out its dirty cache block, the intervenor would then go back to the state it was in, arbitrating for the bus to perform its crossing operation.

Locked Sequences

A locked sequence is a series of two or more NexBus operations of any type that must be performed without any other operations intervening between them, except possibly for an intervention to write back a dirty cache block. A locked sequence on the NexBus can be performed in either of two ways:

The most effective (but not necessarily preferred) method of performing a locked sequence is initiated by the adapter's arbitrating for simultaneous control of the NexBus and AB by asserting its -AREQ line. Once the master takes control of the bus via its -AREQ and performs an operation, it remains the permanent master of the NexBus as long as it continuously asserts its -AREQ signal. The arbiter re-grants the bus to the permanent master as long as its -AREQ continues to be asserted, regardless of other requests, except to grant temporary mastership to an intervenor that asserts -DCL. Taking -AREQ away indicates to the arbiter that the sequence is finished and the bus can be granted to another adapter. If this method is used, the adapter may assert -LOCK after receiving -GNT and at or before the clock during which it asserts -ALE to begin the first operation of the sequence, but is not required to do so. However, if -LOCK is asserted, it should remain asserted throughout the sequence until the last operation is begun. It must be negated at or as soon as possible after the assertion of -ALE for the last operation of the sequence in order to allow re-arbitration of the NexBus and AB.

By this method of performing a locked sequence, the master cannot proceed with the first locked operation of a sequence if the AB is not available, since the ABI is required to get and keep ownership of the AB throughout the sequence. This may be required to prevent a deadlock if any operation in the locked sequence accesses the AB, since it is possible that the current owner of the AB must perform NexBus operation(s) via the ABI before it can relinquish the AB; If the NexBus master did not relinquish the NexBus, the AB master would be locked out of the NexBus. However, in the more usual case, a locked sequence consists of operations all of which either access locations contained in NexBus memory or access locations on the AB, but which never begin by accessing a NexBus location and proceed to access an AB location. (Exception: 80386 CPUs may "run-together" adjacent sequences so that they appear to be one sequence; however, these sequences can be interrupted by a TAL between them without adverse consequences.) Furthermore, any locked sequence that a CPU may attempt to perform in its cache will certainly not involve AB locations if the operations require ownership (as is normally the case), since AB locations can never be cached in the Exclusive or Modified states.

When locked sequences can be so restricted, then the second method of performing them can be used, and is generally preferred: The adapter arbitrates for the NexBus (only) by asserting its -NREQ, and upon receipt of -GNT it may assert -LOCK, at or before the clock during which it asserts -ALE to begin the first operation of the sequence. It then continues to assert both -NREQ and -LOCK to retain control of NexBus until it begins the last operation of the sequence. In order to insure the uninterruptability of this sort of locked sequence, the arbiter must not grant an ABIREQ or interrupt a NexBus-only (-NREQ) master to honor an -AREQ when -LOCK is asserted. Note that, while the first method is guaranteed to be uninterruptable, this second method can be TALed if the master attempts to access any location on the AB. If the master receives a TAL on the first operation of the sequence it should negate both -NREQ and -LOCK and arbitrate for the AB and NexBus together by asserting its -AREQ, and fall back to using the first method of performing locked sequences.

DCL Intervention

When a "dirty cache hit" occurs, the adapter with the dirty cache block, the intervenor, must signal a dirty cache hit by asserting its -DCL line. The GDCL signal notifies both parties to the operation that a cache hit has occurred, and also notifies the arbiter that the intervenor is requesting a special, high-priority bus grant as a temporary bus master. After the operation is over, as determined by the fall of GXACK, the arbiter grants the bus to the intervenor by asserting its -GNT, solely for the purpose of performing a cache block write-back. The arbiter knows not to grant NexBus to any other requester, even if the previous master has asserted -AREQ and/or -LOCK, because the: -DCL signal has the absolutely highest priority. Upon receiving a -GNT, the intervenor must immediately update the memory by performing a four-octet block write onto the bus, beginning at the octet address specified in the original operation. The intervenor must negate -DCL before performing the (first) data transfer, but not before it asserts -ALE. Since the MESI write-back caching protocol is supported only on the NexBus and not on the AB, it is assured that a cache-block write-back operation will not require the use of the AB. However, it should be noted that the AB may be simultaneously active; hence, an AB master may be kept waiting for the NexBus until the intervenor finishes its write-back.

Alternate Bus to NexBus Crossing Operations

The ABI must act as a slave on the AB to perform Alternate-Bus-to-NexBus operations on the NexBus. Since, in general, the AB will not have a TAL-like mechanism, any operation that starts on the AB must be able to be finished without intervening AB operations. Therefore, operations by an AB master that cross onto the NexBus must always have priority over operations by a NexBus master crossing in the opposite direction.

The ABI must know when an operation crosses from the AB to the NexBus. If the AB is an MCA bus or an AT bus, then there may be no indication on the bus when a slave responds to an address, or none that arrives in time to be useful in determining whether the ABI must add wait states to the bus operation; therefore, some other means must be provided to define the memory and I/O maps for each bus. This is done by a MRAM 87, loaded at POST, that contains bit maps representing the memory addresses and I/O addresses that are occupied on the NexBus. This map can be consulted for each address sent on the AB to determine whether the ABI should transfer the operation onto the NexBus and assert an AB WAIT signal, as required.

A "smart" ABI should be able to buffer multiple AB transfers to perform block transfers on NexBus. Some ABIs may allow NexBus masters to cache in write-through mode certain address space located on the AB. This can be done by extending the address map RAM to mark certain areas of the address space as write-through cacheable, and consulting this map for both NexBus and AB operations. Whenever a NexBus master addresses such address space (a NexBus-to-AB crossing operation), the ABI must negate OWNABL and assert GSHARE when it asserts GXACK. In addition, whenever any AB master writes a location that might be cached on the NexBus, the ABI must echo the write onto NexBus with CACHBL and SNPNBL asserted and -OWN negated (an AB-to-NexBus crossing operation).

However, even a "dumb" ABI can save some NexBus cycles by properly negating the CACHBL and -OWN status bits in all AB-to-NexBus crossing operations (other than echoes of cacheable writes), thereby letting NexBus CPUs directly update caches with data written from an AB disk controller and letting them retain Exclusive copies of data read by an AB disk controller. This is particularly important for UNIX and other operating systems that employ I/O buffers that are repeated written by a NexBus CPU (the owner) and read by AB peripherals, or vice-versa.

NexBus to Alternate Bus Crossing Operations

When a NexBus master initiates an operation that crosses over to a slave on the AB, the ABI must recognize this fact and must transfer the operation onto the AB. The simplest way for the ABI to recognize a non-NexBus operation would be to wait to see whether any NexBus adapter causes the GXACK line to be asserted and, if none has responded within three clocks after the assertion of GALE, it could assume a crossing operation. However, this can be speedeel up considerably if the ABI contains a map RAM to specify the population of the NexBus address space. In any case, once it has been determined that an operation specifies an address that is not on the NexBus it can be treated as a crossing operation. Even if the address does not exist on the AB either, it is anticipated that all AB's will have a passive protocol that returns a null response if no slave responds to an address.

The NexBus is a much faster bus than the AB, at least when used to perform block transfers. Because of the bandwidth difference the ABI is required to have registers to queue up data coming to it from the NexBus. This allows the bus operation to terminate on the NexBus while the AB operation continues, which is particularly important if the AB is busy at the time the NexBus operation occurs. No size is specified for the buffer to queue NexBus data, except that it must at least buffer a single read or write crossing operation, including buffering the address, status, lock signal, data, and MID bits. Once the NexBus data buffer is full the ABI either preempts the master on the AB or waits until the AB operation is over and then transfers the contents of its buffer(s) onto the AB. When the buffer is full the adapters on the NexBus are still able to arbitrate for the bus and perform operations that are local to the NexBus.

A crossing write to the AII is performed as follows: When none of the adapters on the NexBus assert their -XACK or when the ABI detects that a NexBus operation addresses space on the AB (as determined by ABI implementation), the ABI realizes that it should respond to the operation. If the adapter has won simultaneous NexBus and AII mastership by asserting its -AREQ line, then the ABI (which is in control of the AII) samples the data and immediately begins one or more AB writes to send it to its intended destination. If the adapter has won NexBus mastership by asserting its -NREQ line (rather than -AREQ) and if either the buffer in the ABI is full or the AReqReg is not empty, then the ABI issues its TAL signal to the master telling it to Try Again Later, and asserts its -XACK. When the master receives an active TAL signal it must re-arbitrate for the bus via its -AREQ line. If the ABI has free buffer space and no AReqReg requests are pending, the ABI may sample the data from the bus and acknowledges the operation by asserting its -XACK signal. The adapter is then done with the operation and it is the responsibility of the ABI to get control of the AII and execute the write.

A crossing read to the AII is performed slightly differently, in that its execution depends upon the speed and immediate availability of the AB, creating three different situations: If the AB has reasonably fast access time, e.g. the MCA bus, AND if the AB is immediately available to the ABI, AND if the ABI's buffers are completely empty (no uncompleted operation pending), then the read operation is done immediately and returned to the sender. If the above conditions are not all true AND the ABI has no buffer space available, then it asserts TAL to abort the operation, and then forgets about it. The master then re-arbitrates for the NexBus by asserting its -AREQ line and re-tries the operation. If the above conditions are not all true AND if the ABI has available buffer space, then the ABI stores the address and status in its buffers and starts executing the read on the AB. The ABI may issue TAL to the master or not, as conditions warrant. If the ABI is performing a write operation and has control of the AB, it may be advantageous to allow the master to wait for the read data; otherwise, it may issue TAL. If it does so, the master arbitrates for the bus again using its -AREQ line, and retries the operation. When this happens and the same master re-tries the operation, the ABI places the data onto the bus, and it issues its -XACK without TAL to transfer the data and thus complete the operation.

If a crossing operation to the AB (either a read or a write) addresses a cacheable structure, the ABI may (but need not) assert GSHARE and GBLKNBL and negate OWNABL to allow the NexBus master to cache the data in a Shared state. Allowing cacheable regions on the AB is an optional feature of the ABI. If implemented, it requires a map RAM to indicate which regions of AB address space are cacheable and which are not. Note that since the AB does not support the NexBus MESI (Modified, Exclusive, Shared, Invalid) caching algorithm no part of the AB address space may ever be Owned by a NexBus cache. It is important, therefore, that OWNABL be negated by the ABI whenever it asserts GBLKNBL, in order to prevent a NexBus master from claiming ownership.

Conclusion

In conclusion it can be seen that the present invention provides an effective way to allocate bus resources among competing devices and maximize the effective bandwidth in a dual-bus system.

While the above is a complete description of the preferred embodiments of the invention, various alternatives, modifications, and equivalents may be used. For example, while the AD-bus is shown as a multiplexed bus, it could, in principle, be implemented with separate address and data line.

Additionally, the specific embodiment uses the TAL signal (which goes to the adapters) to cause the adapter to assert its -AREQ line, and uses the SavedTAL signal (which is internal to the control logic) to cause the TALed adapter's AREQ request to be recognized immediately. That is, SavedTAL causes the adapter's bit to be set in the AReqReg without having to wait for the next time the AReqReg is loaded by sampling all the -AREQ lines. It is possible, however to provide this automatic recognition in response to TAL itself, regardless of whether SavedTAL is asserted, or is even supported. Additionally, although TAL is presently asserted only when the AB is unavailable, it is possible (as was alluded to above) to have the ABI assert TAL and SavedTAL when the AB is available but the operation on the AB will take a very long time to complete.

Additionally, the specific embodiment uses a Map RAM to specify the addresses of NexBus adapters. It is also possible to have a protocol where a memory address is presumed to be on the NexBus unless it is explicitly mapped to be on the AB, and an I/O address is presumed to be on the AB unless it is explicitly mapped to be on the NexBus. Moreover, certain assumptions can be made regarding explicit ranges to support video RAM and BIOS extensions. For example, all memory addresses, except those in some predefined ranges, are presumed to be on the NexBus. It is also possible, and probably preferred for implementation reasons, to use a pair of registers to specify a range of addresses rather than a RAM to specify individual addresses.

Furthermore, while the specific embodiment prioritizes AREQ and NREQ requests by slot number, other regimes could be used, especially since the present prioritization could result in certain masters receiving a disproportionate share of the bus bandwidth when the bus is heavily used. For example, a round robin arrangement that rotated the high-priority positions or a regime where priority was based in part on past usage of the bus could be used to even out the bus allocation if such were desired.

Also, it is a feature of the present embodiment that an adapter can assert only one of its request lines at a time. This could be varied by encoding the requests on a pair of lines, or allowing both request lines to be asserted simultaneously in order to allow the adapter to provide additional information regarding the request. This could be used, for example, to implement a further level of priority, somewhat akin to DCL intervention.

Therefore, the above description should not be taken as limiting the scope of the invention which is defined by the appended claims.

TABLE 1

NexBus Signal Description

AD<63:0>: Address, Status and Data bits 63 through 0: This bus conveys either address and status or data. During an address transfer phase, indicated by the assertion of GALE, AD<63:0> contains address and status information defining a bus operation. During the data transfer phase, signaled by the assertion of GXACK, this bus contains up to 64 bits of data.

-ALE[n], GALE: Address Latch Enable: The -ALE[n] signals are issued by the master. The GALE signal is monitored by all devices on the NexBus to latch the address placed on the bus by the master.

-AREQ[n]: The Alternate Bus Request signals are driven by would-be masters on the NexBus to secure bus mastership together with control of the AB. The arbiter examines these signals together with the -NREQ signals and the state of the ABI to determine which device is to be granted mastership of the NexBus. It also passes AB requests to the ABI to cause it to gain control of the AB. The requesting devices drive these signals active at the rising edge of the BCLK.

AUDIO: This is an audio sum node used to drive audio signals from an adapter to the system audio output, or to transfer audio signals between adapters. This line is electrically compatible with the similar line defined on the MCA bus, and in a system having a MCA bus as an AB it may be electrically connected to the MCA's AUDIO line.

AUDIO GND: This is a separate ground for the audio subsystem. It must never be connected to system GND at any point except the subsystem's audio amplifier (radial grounding).

+/-BCLK: These are the TTL-level bus clock and its inversion which define the NexBus clock period. They are received on each board by a clock chip and are terminated on-board by a 86-ohm resistor to 3V (nominal equivalent).

-BLKNBL[n], GBLKNBL: In memory-access operations, the slave drives Block Enable active to indicate that the addressed portion of its address space may be cached. Main-memory slaves assert -BLKNBL, whereas paged devices such as video adapters generally do not. If a slave does not assert its -BLKNBL signal, it cannot support block transfers. In DMA operations, the slave drives -BLKNBL active to abort the current DMA sequence.

-CHCHK: Channel Check is generated on the adapters on the NexBus upon detection of a system-wide error condition. It is gated by logic in the ABI to cause the -NMI pin of the primary processor on the NexBus to be asserted.

-DCL[n], GDCL: Dirty Cache Lock: The -DCL[n] signals are issued by all the caching devices on the bus. The purpose of this signal is to let the caching devices indicate that the current read or write operation hit in a dirty cache block. During reads, GDCL indicates to the master that data supplied by the slave is stale. During all types of operations, the -DCL fines are used to preemptively gain control of the bus so that the intervenor can supply updated memory to the requestor and to memory by doing a block write.

GATEA20: This signal, which exists only on the Primary Processor slot, slot OFh, is driven by the ABI and received by the primary processor. When this signal is active, the processor drives bit 20 of the address line to any desired value. When this bit is inactive, bit 20 of the address is set to zero. The purpose of this signal is to replicate the method in which IBM PC's work around an 80286 bug in implementing address wrap around for addresses above the address limit.

-GNT[n]: The Bus Grant signals are driven by the arbiter to the arbitrating devices on the NexBus to indicate that the bus has been granted to the requesting device. These signals are driven active at the rising edge of the BCLK.

-INTR[n]: The Interrupt signals are generated by the interrupt controllers on the ABI and dispatched radially to each processor slot (primary or secondary) on the NexBus.

-IRQ<3:7,9:12,14:15>: The Interrupt Request signals are logically combined with the interrupt request lines on the AB, and are used by individual devices on the NexBus to gain the attention of a processor. Certain interrupt levels are pre-defined: -IRQ<0> is a periodic interrupt from the system timers; -IRQ<1> is the interrupt from the Keyboard Controller; -IRQ<2> is an internal cascade signal from one interrupt controller to another and is not available for use; -IRQ<8> is used as a general purpose interrupt from the Real Time Clock. -IRQ<13> is derived from -NPIRQ[n] lines (as described below). Therefore, only levels 3-7, 9-12, and 14-15 are available as lines on the NexBus.

-LOCK[n]: The Lock signal is driven by the master during sequences such as Read-Modify-Write where a number of bus operations must be performed sequentially and uninterruptedly. These signals are used by the arbiter to determine the end of a bus sequence.

-NMI: The Non-Maskable Interrupt, which exists only on the Primary Processor slot, SlotID OFh, is generated by the ABI in response to any of several error conditions, including -CHCHK on the NexBus or Alternate Bus. It drives the -NMI pin of the primary processor on the NexBus.

-NPIRQ[n]: The Numeric Processor Interrupt Request lines, which exist only on the processor slots, slotIDs OCh—OFh, are driven active by a processor to cause a level-13 interrupt request to the interrupt controller that services that processor slot.

-NREQ[n]: The NexBus Request signals are driven by the masters on the NexBus. The arbiter examines them in conjunction with the -AREQ lines and the state of the ABI to arbitrate bus mastership at the end of each bus sequence. At any time one or more of these signals may be active, requesting the bus, but only one can be granted the NexBus. The bus request signals normally remain active until the corresponding grant line goes active. The requesting devices drive these signals active at the rising edge of the BCLK.

OWNABL: The Ownable signal is negated (driven low) by the ABI to indicate that the addressed memory may be cached in the Shared state but may not be owned. The ABI may selectively negate OWNABL and assert GBLKNBL on crossing transfers, according to the state of a map RAM which defines cacheable areas of AB address space. The ABI must assert GSHARE whenever it negates OWNABL. OWNABL must be ignored except when GBLKNBL is asserted. Note to CPU designers: When a write-through caching CPU observes the combination of OWNABL negated when GSHARE is negated (which is defined to be illegal on the NexBus) and the CPU is performing a Block4 or Block8 read, the CPU should place the data into its cache in the Modified state (regardless of whether the CPU asserted -OWN status when requesting the read). This will enable the CPU to be adapted to certain foreign (non-NexBus) caching protocols which support cache-to-cache transfer of dirty cache blocks without updating memory.

-RESET: The Reset signal is driven by the bus backplane and received by all the devices on the bus. The purpose of this signal is to reset all the adapters on the NexBus. It is redundant, since the same information is contained on the SR signal.

-RESETCPU: The Reset CPU signal, which exists only on the Primary Processor slot, slotID OFh, is generated by the ABI and received by the primary processor. The purpose of the this signal is to reset one designated processor.

-SHARE[n], GSHARE: The Shared Data signals are issued by all the caching devices on the bus. The purpose of this signal is to let the caching devices indicate that the current read operation hit in a cache block that is present in another device's cache. During reads, GSHARE indicates to the master that data being read must be cached as SHARED (if cached at all), unless the master has asserted -OWN (transmitted on AD<49> during the address/status phase of a bus operation). The state of GSHARE must be ignored during any operations with -OWN asserted.

SLOTID<3:0> : Slot ID bits 3 through 0 are encoded on the connector to geographically distinguish one slot from another. This will allow the NexBus to have a maximum of sixteen slots.

SR: The Sync/Reset signal, which originates in the master Clock Distribution (CDIS) chip, is distributed radially on the backplane. It conveys a serial code which includes timing information to synchronize all CDIS chips on all adapters. It also conveys the System RESET signal and bus operating frequency information.

TAL: The Try Again Later signal indicates to the master that the current operation cannot be completed at this time because the AB is not available. The TAL signal is transmitted by the ABI, and monitored by all master devices on the NexBus. Upon detecting an active TAL, the master will abort the current operation and will re-try it later. In order to secure the bus for re-trying the operation, the master must assert its -AREQ, thereby assuring that the AB will be available when it is re-granted the bus.

-XACK[n], GXACK: The Transfer Acknowledge signals are driven by the slave after it has decoded the address and determined that it is a party in the current operation. The ABI monitors GXACK to determine whether a NexBus device responds to an address within three clocks, to decide whether it needs to perform a crossing operation. During a read operation the master monitors GXACK and GXHLD to determine when data is available on the bus. During a write operation the master again monitors these signals to determine when data is accepted by the slave. An ABI may take a variable number of cycles to respond to a GALE, and the maximum period of time between assertion of GALE and the responding GXACK is not specified.

-XHLD[n], GXHLD: The Transfer Hold signals may be driven by the master, the slave, or by a third party monitoring an operation, in order to insert wait states into an operation. Both master and slave must monitor GXHLD to synchronize data transfer.

TABLE 2

Address and Status Information

AD<1:0>: Reserved: Current bus masters must drive these bits high (inactive).

AD<2>: ADRS<2> is used as the least-significant 4-byte quad address for I/O operations. It is not used for memory-reference operations and may be driven to either defined state (either 0 or 1).

AD<31:3>: ADRS<31:3> specify an octet (64-bit quantity) within the 4-Gbyte memory address space for memory references. ADRS<15:3> specifies an octet address within the 64-Kbyte I/O address space for I/O operations, and AD<31:16> must be 0.

AD<39:32>: -BE<7:0> Byte-Enable bits 7 through 0 are framing bits associated with the data of the current bus operation. In I/O operations, -BE<7:4> are not used and must be driven high (inactive), while -BE<3:0> specify the byte(s) to be transferred on AD<31:0>. In a memory operation, all eight bits are used to specify the byte(s) to be transferred on AD<63:0>. In a multi-octet block transfer operation the BE's have meaning only for the first octet of the transfer, and only for BLOCK4 write operations; the rest of the octets have implicit byte enable bits of all 0's, i.e., all bytes are to be transferred in each of the other DWords. Even if a master is requesting a block read operation, it should use the BE's to specify the bytes that it needs immediately, since a non-cacheable slave may force a single-octet transfer operation and then needs only to return to the master only those bytes for which BE's are asserted. Note that -BE<7:0> must be all-zeros for Block Write operations, except when performing an intervenor operation; i.e., only full-block writes are allowed, except to write back the remaining bytes following a partial-octet write operation.

AD<45:40>: MID<5:0>: Master ID bits 5 through 0 are driven by the masters indicating their ID number. It indicates to the slave, and to the ABI during crossing operations, which master is currently doing operations on the bus. The most significant four bits of the MID field are the same as the SLOTID bits. The least significant 2 bits are dependent upon the devices in the designated slot. So, a given slot may accommodate up to four devices.

AD<48:46>: OP_TYPE<2:0> are driven by the master to define the type of operation to be performed. Note that AD<48:46> have the same meaning that these signals have in the 80386 microprocessor.

| AD<48> M/−IO | AD<47> D/−C | AD<46> W/−R | BUS OPERATION TYPE |
|---|---|---|---|
| 0 | 0 | 0 | INTERRUPT ACK |
| 0 | 0 | 1 | HALT, SHUTDOWN |
| 0 | 1 | 0 | I/O DATA READ |
| 0 | 1 | 1 | I/O DATA WRITE |

-continued

| AD<48> M/−IO | AD<47> D/−C | AD<46> W/−R | BUS OPERATION TYPE |
|---|---|---|---|
| 1 | 0 | 0 | MEM CODE READ |
| 1 | 0 | 1 | HALT, SHUTDOWN |
| 1 | 1 | 0 | MEM DATA READ |
| 1 | 1 | 1 | MEM DATA WRITE |

AD<49>: -OWN may be driven active during read or write operations. This signal is driven by the master during such operations requesting the ownership of data in its cache. If this operation hits in the cache of another caching master, then that master must change the status of its cache line to the ABSENT, rather than SHARED, state.

AD<51:50>: -BLKSIZ<1:0>: For memory references, these two bits define the size of data requested to be transferred in the operation, as shown in Table 2, below. For single-octet operations and block writes, the bytes to be transferred in the first octet, hence, the size of the transfer, can be specified by the Byte Enable bits described above. Note that if the slave is incapable of transferring more than a single octet it may deny a request for a larger block by negating its XACK signal after a single octet, or the bytes thereof specified by the Byte Enable bits, have been transferred. Note also that 8-octet (Block8) operations may not be supported by all slave devices, in which case the slave must treat the Block8 operation exactly as if it were a Block4 operation. Finally, note that 2-octet (Block2) block write operations are not snooped (only reads), and therefore only Block2 writes to regions of the address space which are never cached are permitted. These bits should be "1" for I/O operations.

| −BLKSIZ<1> AD<51> | −BLKSIZ<0> AD<50> | BLOCK SIZE |
|---|---|---|
| 1 | 1 | Single octet (0 to 8 bytes) |
| 1 | 0 | Block2 (16 bytes) |
| 0 | 1 | Block4 (32 bytes) |
| 0 | 0 | Block8 (Optional) (64 bytes) |

AD<55:52>: DMACH<3:0>: If these bits are any code except all-1's, DMACH indicates that the operation is part of an AB DMA-controller sequence for the DMA request level defined by the value of DMACH<3:0>. If DMACH<3:0>=0Fh (all-1's), it indicates that the operation is not part of an AB DMA sequence. All NexBus masters except the ABI's DMA Access Facility must drive DMACH<3:0> to a high level.

AD<56>: DMATC: When DMACH<3:0> is not all-1's, DMATC indicates that the terminal count for the DMA channel indicated by DMACH<3:0> has been reached with the current operation. When DMACH<3:0> is all-1's, DMATC should also be 1.

AD<57>: SNPNBL: Snoop Enable, normally asserted. May be negated by a master beginning an operation which affects memory space that is guaranteed NOT to be present in any other device's cache, e.g., for write-back of a dirty cache block. Any snooping device that observes an operation for which SNPNBL is negated need not look up the addressed block(s) in its cache tags. While negating SNPNBL when appropriate is desirable for improved efficiency, it is not required.

AD<58>: CACHBL: Cacheable, normally asserted. May be negated by a master which will not retain a copy of the addressed cache block(s) after the operation, e.g., a disk controller moving data to/from a communication buffer. Any snooping device that detects a hit in its cache line may must always intervene to supply read data if the cache line is in the Modified state, but if CACHBL is negated it may update its cache line from the transferred data if the operation is a write, and it may keep the addressed block(s) in its cache in a Modified state (if a write occurred) or Exclusive state (if a read occurred), rather than transitioning to a Shared state, provided that the block(s) was in Exclusive or Modified state prior to the operation. While negating CACHBL when appropriate is desirable for improved efficiency, it is not required.

AD<63:59>: Reserved: Current bus masters must drive these bits high (inactive).

TABLE 3

Control Signals

Radial and Group Signals

These signals are driven radially from each adapter to motherboard logic. Corresponding group signals (prefix G) are derived from NANDing the adapter signals. Group signals are distributed to the adapters within one clock period.

-ALE[n]              GALE
    -AREQ[n]
    -BLKNBL[n]       GBLKNBL
    -DCL[n]             GDCL
    -LOCK[n]         (GLOCK)
    -NPIRQ[n]
    -AREQ[n]
    -NREQ[n]
    -SHARE[n]        GSHARE
    -XACK[n]         GXACK
    -XHLD[n]         GXHLD

Synchronous Radial Receive-Only Signals

These signals are driven by motherboard logic on one clock edge and received on the adapters on the next clock edge.

-GNT[n]
    OWNABL
    -RESET
    -RESETCPU
    SR
    TAL

Asynchronous Signals

These signals are asynchronous. All except those marked with an (*) are driven by motherboard logic and received by the adapters.

-CHCHK (*)
    GATEA20
    -INTR[n]
    -IRQ<3:7,9:12,14:15> (*)
    -NMI
    SLOTID<3:0>

TABLE 4

Map RAM (MRAM) and Extended Control

The MRAM contains a map of the NexBus address space, defining which areas address adapters on the NexBus itself and which address adapters on the Alternate Bus. The MRAM is loaded at POST with a map of all addresses that are located on the NexBus. The ABI then directs to the NexBus all operations on the AB which address these areas, and treats all other AB operations as local to the AB.

In order to map the entire 4-GB memory address space and the 64-KB I/O address space compactly, they are represented in a 64K-by-1 RAM. If any location in an address block is used by a NexBus adapter, no part of the address block may be used by an AB adapter, and vice-versa. The map is divided into three sections: The 64-KB I/O address space is divided into blocks of four bytes, represented by MRAM bits 0 to 16,383 (0 to 16k−1). Extended Memory from 1 MB to the top of memory (4 GB) is divided into blocks of 128 KB, represented by MRAM bits 32,776 (=32K+8) to 65,535 (=64K−1). Finally, conventional memory from 0 to (1MB−1) is divided into blocks of 2 KB, represented by 512 MRAM bits in the range of 16,383 to 32,767. For each block, a "1" in the corresponding bit of the MRAM indicates that the block resides on the NexBus, while a "0" indicates that it is on the AB.

In order to minimize logic and to compact the addressing of the MRAM, the mapping of the address space is not linear. The region between 0 and (256K−1) is represented by MRAM bits (A/16+124), where A is the lowest address in the 2-KB block being mapped. The region between 256K and (512K−1) is represented by MRAM bits (A/16−16259). The region between 512K and (768K−1) is represented by MRAM bits (A/16−32642). The region between 768K and (1M−1) is represented by MRAM bits (A/16−49025). Thus, the 2KB block beginning at 0 is represented by MRAM bit (0/16+124)=124; the block beginning at 540672 (=512K+16K) is mapped by bit (540672/16−32642)=1150; and the block beginning at 768K is mapped at (768432/16−49025)=127.

The MRAM must be loaded at POST, and therefore must itself be addressable at that time. In order to control the mapping of the MRAM and other control structures in the ABI, the ABI is assigned a "virtual slot address" of 0; That is, the ABI can use the initialization register address space of SlotID 0, since no physical Slot 0 will be implemented on the NexBus. Since the ABI does not need the Initialization Registers defined above, the entire 512-KB address space for slot 0 can be used as convenient. At this time, there are three addressable structures defined for the ABI: the Extended Control Register (ECR), the DMA Access Facility Register (DAFR), and the MRAM (MRAM). The ECR is addressed as the least-significant three bits of 32-bit Quad 0 of Page 0. The DAFR (if implemented) is addressed as the least-significant byte of 32-bit Quad 2 of Page 0. (The rest of Pages 0 through 15 should not be accessed). The lower four bits of the ECR are reset to 0 by the -RESET signal. Four functions are defined for the ECR: Bit 0 is the MRAM Enable bit (MRE); When cleared, bit 0 enables reading and writing the MRAM. When bit 0 is cleared, all operations on the AB are assumed to be local. When it is set, the MRAM is active. Bit 1 is the ROM Page Select bit; It selects between two 64-KB "pages" for the BIOS ROM. Bit 2 is the Spin-Lock bit. When enabled for writing by bit 0 of the Extended Control Register, the MRAM is addressed as bit 3 of each 32-bit Quad in the upper half of the ABI's address space, as defined below. Bit 3 of the Extended Control Register is the ATTN IRQ Select bit (AIS).

| 31 | 20 19 18 17 | | 2 1 0 |
|---|---|---|---|
| FF0h | 0 1 | Map RAM Address | 0 0 |

The table below shows the mapping of NexBus address bits to MRAM address bits for each of the four cases: loading the MRAM (as shown), looking up an Extended Memory access, looking up a Conventional Memory access, and looking up an I/O access.

| Map RAM Addrs Bits | 15 14 13 12 | 11 10 9 8 | 7 6 5 4 | 3 2 1 0 |
|---|---|---|---|---|
| Driven by AD Bits: | | | | |
| Loading (MRE = 0) | 17 16 15 14 | 13 12 11 10 | 9 8 7 6 | 5 4 3 2 |
| Extended Memory | Hi 31 30 29 | 28 27 26 25 | 24 23 22 21 | 20 19 18 17 |
| Conventional Mem. | Lo Hi 17 16 | 15 14 13 12 | 11 Hi Hi Hi | Hi Hi 19 18 |
| I/O Access | Lo Lo 15 14 | 13 12 11 10 | 9 8 7 6 | 5 4 3 2 |

Optionally, the MRAM may be configured as a 64K-by-2RAM in order to further specify the behavior of crossing transfers. In this configuration, the MRAM is addressed (when MRE=0) as bits 3:2 of each 32-bit Quad of the upper half of the ABI's Initialization Register address space, as shown above. In this case, bit 3 defines whether the address space exists on the NexBus or the AB, just as defined above: If bit 3 is 1, the address space is located on the NexBus, otherwise it is on the AB. Bit 2, if implemented, is interpreted differently for NexBus and AB address space: If MRAM<3>=1 (NexBus address space), MRAM<2> is 1 if the space is accessible to AB masters, while a 0 indicates that no crossing transfer from AB to NexBus is allowed for the corresponding addresses. This allows software to configure "protected" areas of NexBus address space. If MRAM<3>=0 (AB address space), MRAM<2>=1 if the space is non-cacheable, while a 0 makes the address space cacheable but non-ownable. Note that if bit 2 of the MRAM is not implemented, the available configurations are limited to those with MRAM<2>=1: all NexBus space is accessible from the AB, and all AB space is non-cacheable.

What is claimed is:

1. A bus interface unit for a computer system having at least a first bus and a second bus, wherein the architecture of said first bus supports coupling to a first bus master for generating a first bus transfer, said first bus transfer including an address, said architecture having a first bus control signal selectively indicating said first bus transfer is claimed by a device addressed by said address, said bus interface unit comprising:
   bidirectional first bus interface logic coupled to said first bus;
   bidirectional second bus interface logic coupled to said second bus;
   a bidirectional path coupled between said first bus interface logic and said second bus interface logic;
   address mapping logic having programmable storage for first bus configuration data for a plurality of address regions to permit said address regions to be associated with said first bus; and
   control logic means, coupled to said first and second bus interface logic, for enabling a crossing transfer from said first bus to said second bus without waiting for assertion of said first bus control signal if said address of said first bus transfer is not mapped to one of said address regions that is associated with said first bus.

2. The bus interface unit of claim 1, wherein the architecture of said second bus has a passive protocol for terminating a bus transfer.

3. The bus interface unit of claim 1, wherein:
   the architecture of said first bus has a multimaster arbitration protocol; and said bus interface unit further comprises a buffer, coupled to said path, for storing said first bus transfer, such that said first bus can immediately perform other operations while said bus interface unit completes said crossing transfer on said second bus.

4. The bus interface unit of claim 1, wherein:
the architecture of said first bus has a multimaster arbitration protocol;
the architecture of said second bus has a passive protocol for terminating a bus transfer; and
said bus interface unit further comprises a buffer, coupled to said path, for storing said first bus transfer, such that said first bus can immediately perform other operations while said bus interface unit completes said crossing transfer on said second bus.

5. The bus interface unit of claim 1, wherein said address mapping logic includes a map RAM.

6. A bus interface unit for a computer system having at least a first bus and a second bus, wherein the architecture of said first bus has a multimaster arbitration protocol and supports coupling to a first bus master for generating a first bus transfer, said first bus transfer including an address, said architecture having a first bus control signal selectively indicating said first bus transfer is claimed by a device addressed by said address, and wherein said second bus has a passive protocol for terminating transfers on said second bus and supports coupling to a second bus master for generating a second bus transfer, said second bus transfer including a second address, said bus interface unit comprising:
bidirectional first bus interface logic coupled to said first bus;
bidirectional second bus interface logic coupled to said second bus;
a bidirectional path coupled between said first bus interface logic and said second bus interface logic;
address mapping logic having programmable storage for first bus configuration data for a plurality of address regions to permit said address regions to be associated with said first bus; and
control logic means, coupled to said first and second bus interface logic,
for enabling a first type of crossing transfer from said first bus to said second bus over said path if said first bus control signal is not asserted within a predefined waiting period after said first bus master initiates said first bus transfer, and
for enabling a second type of crossing transfer from said second bus to said first bus over said path if said second address of said second bus transfer is mapped to one of said address regions that is associated with said first bus.

7. The bus interface unit of claim 6, wherein at least some of said address regions have different block sizes among said regions.

8. The bus interface unit of claim 6, wherein said control logic means enables said first type of crossing transfer from said first bus to said second bus over said path without waiting for assertion of said first bus control signal if said address of said first bus transfer is not mapped to one of said address regions that is associated with said first bus.

9. The bus interface unit of claim 6, wherein said computer system includes I/O, conventional memory, and extended memory and wherein said plurality of address regions include separate address regions for said I/O, conventional memory, and extended memory.

10. The bus interface unit of claim 6, wherein said computer system includes I/O, conventional memory, and extended memory and wherein said plurality of address regions include separate addres regions for said I/O, conventional memory, and extended memory.

11. The bus interface unit of claim 6, wherein said address mapping logic includes a map RAM.

12. A bus interface unit for a computer system having at least a first bus and a second bus wherein said second bus has a passive protocol for terminating transfers on said second bus and supports coupling to a second bus master for generating a second bus transfer, said second bus transfer including a second address, said bus interface unit comprising:
bidirectional first bus interface logic coupled to said first bus;
bidirectional second bus interface logic coupled to said second bus;
a bidirectional path coupled between said first bus interface logic and said second bus interface logic;
address mapping logic having programmable storage for first bus configuration data for a plurality of address regions to permit said address regions to be associated with said first bus, said address regions including explicit memory ranges corresponding to video memory and BIOS extensions; and
control logic means, coupled to said first and second bus interface logic, for enabling a crossing transfer from said second bus to said first bus over said path if said second address of said second bus transfer is mapped to one of said address regions that is associated with said first bus.

13. The bus interface unit of claim 12, wherein said computer system includes I/O, conventional memory, and extended memory and wherein said plurality of address regions include separate address regions for said I/O, conventional memory, and extended memory.

14. The bus interface unit of claim 12, wherein said address mapping logic includes a map RAM.

15. A bus interface unit for a computer system having at least a first bus and a second bus, wherein said second bus has a passive protocol for terminating transfers on said second bus and supports coupling to a second bus master for generating a second bus transfer, said second bus transfer including a second address, said bus interface unit comprising:
bidirectional first bus interface logic coupled to said first bus;
bidirectional second bus interface logic coupled to said second bus;
a bidirectional path coupled between said first bus interface logic and said second bus interface logic;
address mapping logic having programmable storage for first bus configuration data for a plurality of address regions to permit said address regions to be associated with said first bus, said address regions differing in block size among said regions; and
control logic means, coupled to said first and second bus interface logic, for enabling a crossing transfer from said second bus to said first bus over said path if said second address of said second bus transfer is mapped to one of said address regions that is associated with said first bus.

16. The bus interface unit of claim 15, wherein said computer system includes I/O, conventional memory, and extended memory and wherein said plurality of address regions include separate addres regions for said I/O, conventional memory, and extended memory.

17. The bus interface unit of claim 15, wherein said address mapping logic includes a map RAM.

18. A bus interface unit for a computer system having at least a first bus and a second bus, wherein the architecture of said first bus has a multimaster arbitration protocol and supports coupling to a first bus master for generating a first bus transfer, said first bus including an address, said architecture having a first bus control signal selectively indicating said first bus transfer is claimed by a device addressed by said address, and wherein said second bus has a passive protocol for terminating transfers on said second bus and supports coupling to a second bus master for generating a second bus transfer, said second bus transfer including a second address, said bus interface unit comprising:

bidirectional first bus interface logic coupled to said first bus;

bidirectional second bus interface logic coupled to said second bus;

a bidirectional path coupled between said first bus interface logic and said second bus interface logic;

address mapping logic having programmable storage for first bus configuration data for a plurality of address regions to permit said address regions to be associated with said first bus;

control logic means, coupled to said first and second bus interface logic, for enabling a first type of crossing transfer from said first bus to said second bus over said path if said first bus control signal is not asserted within a predefined waiting period after said first bus master initiates said first bus transfer, and for enabling a second type of crossing transfer from said second bus to said first bus over said path if said second address of said second bus transfer is mapped to one of said address regions that is associated with said first bus; and a buffer, coupled to said path, for storing said first bus transfer, such that said first bus can immediately perform other operations while said bus interface unit completes said first type of crossing transfer on said second bus.

19. The bus interface unit of claim 18, wherein said computer system includes I/O, conventional memory, and extended memory and wherein said plurality of address regions include separate address regions for said I/O, conventional memory, and extended memory.

20. A bus interface unit for a computer system having at least a first bus and a second bus, wherein the architecture of said first bus has a multimaster arbitration protocol and supports coupling to a first bus master for generating a first bus transfer, said first bus transfer including an address, said architecture having a first bus control signal selectively indicating said first bus transfer is claimed by a device addressed by said address, and wherein said second bus has a passive protocol for terminating transfers on said second bus and supports coupling to a second bus master for generating a second bus transfer, said second bus transfer including a second address, said bus interface unit comprising:

bidirectional first bus interface logic coupled to said first bus;

bidirectional second bus interface logic coupled to said second bus;

a bidirectional path coupled between said first bus interface logic and said second bus interface logic;

address mapping logic having programmable storage for first bus configuration data for a plurality of address regions to permit said address regions to be associated with said first bus;

control logic means, coupled to said first and second bus interface logic, for enabling a first type of crossing transfer from said first bus to said second bus without waiting for assertion of said first bus control signal, if said address of said first bus transfer is not mapped to one of said address regions that is associated with said first bus, and for enabling a second type of crossing transfer from said second bus to said first bus over said path if said second address of said second bus transfer is mapped to one of said address regions that is associated with said first bus; and a buffer, coupled to said path, for storing said first bus transfer, such that said first bus can immediately perform other operations while said bus interface unit completes said first type of crossing transfer on said second bus.

21. The bus interface unit of claim 20, wherein said address mapping logic includes a map RAM.

* * * * *